(12) United States Patent
Houze, Jr.

(10) Patent No.: US 9,969,247 B1
(45) Date of Patent: May 15, 2018

(54) CANOPY FOR A GOLF CART STORAGE AREA

(71) Applicant: John Houze, Jr., Richmond, VA (US)

(72) Inventor: John Houze, Jr., Richmond, VA (US)

( * ) Notice: Subject to any disclaimer, the term of this patent is extended or adjusted under 35 U.S.C. 154(b) by 98 days.

(21) Appl. No.: 15/201,853

(22) Filed: Jul. 5, 2016

(51) Int. Cl.
*B60J 7/04* (2006.01)
*B60J 7/047* (2006.01)

(52) U.S. Cl.
CPC .................................... *B60J 7/047* (2013.01)

(58) Field of Classification Search
CPC ... B60J 7/10; B60J 7/1278; B60J 11/00; B60J 7/08; B60J 7/1282
USPC ........... 296/100.14, 100.16, 111, 83, 100.15, 296/100.18, 146.8, 37.1, 77.1, 80, 100.03
See application file for complete search history.

(56) References Cited

U.S. PATENT DOCUMENTS

| | | | |
|---|---|---|---|
| 5,069,481 A * | 12/1991 | Strange | B62J 11/00 211/70.2 |
| 6,007,134 A | 12/1999 | Weston | |
| 6,068,325 A | 5/2000 | Hughes | |
| 6,216,714 B1 | 4/2001 | Tucker | |
| 6,220,647 B1 | 4/2001 | Winkler | |
| 6,227,217 B1 | 5/2001 | Peta | |
| 6,481,780 B2 | 11/2002 | Dolan | |
| 6,601,904 B2 | 8/2003 | Winkler | |
| D513,490 S | 1/2006 | Held | |
| 7,093,872 B2 | 8/2006 | Stanfield | |
| 7,364,216 B2 | 4/2008 | Tyrer | |
| 7,438,345 B2 * | 10/2008 | Mrotek | B60J 7/1226 296/116 |
| 7,448,666 B2 * | 11/2008 | Tyrer | B60J 7/085 296/100.14 |
| 7,677,634 B2 * | 3/2010 | Flynn | B60J 7/1226 296/107.09 |
| 8,069,899 B2 * | 12/2011 | Nation | B60J 7/10 135/88.01 |

* cited by examiner

*Primary Examiner* — D Glenn Dayoan
*Assistant Examiner* — Sunsurraye Westbrook
(74) *Attorney, Agent, or Firm* — Kyle A. Fletcher, Esq.

(57) ABSTRACT

The golf cart canopy is adapted for use with a golf cart. The golf cart canopy is a non-fixed canopy that provides weather protection for passengers or items that are stored in the rear section of the golf cart. The golf cart canopy is retractable when weather protection is not desired. The golf cart canopy comprises a canopy, a first support, and a second support.

19 Claims, 4 Drawing Sheets

CANOPY FOR A GOLF CART STORAGE AREA

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of windshields, windscreens and retractable roofs for a vehicle, more specifically, a retractable roof adapted for use with a golf cart.

SUMMARY OF INVENTION

The golf cart canopy is adapted for use with a golf cart. The golf cart canopy is a non-fixed canopy that provides weather protection for passengers or items that are stored in the rear section of the golf cart. The golf cart canopy is retractable when weather protection is not desired.

These together with additional objects, features and advantages of the golf cart canopy will be readily apparent to those of ordinary skill in the art upon reading the following detailed description of the presently preferred, but nonetheless illustrative, embodiments when taken in conjunction with the accompanying drawings.

In this respect, before explaining the current embodiments of the golf cart canopy in detail, it is to be understood that the golf cart canopy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the golf cart canopy.

It is therefore important that the claims be regarded as including such equivalent construction insofar as they do not depart from the spirit and scope of the golf cart canopy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
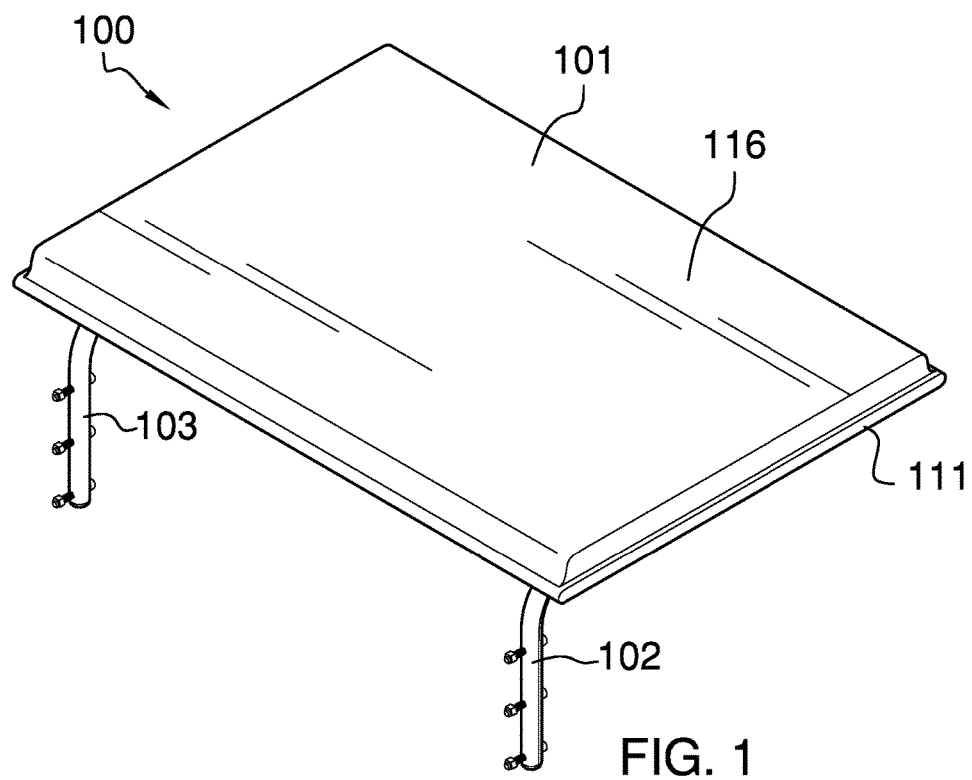
FIG. 1 is a perspective view of an embodiment of the disclosure.
Figure 2:
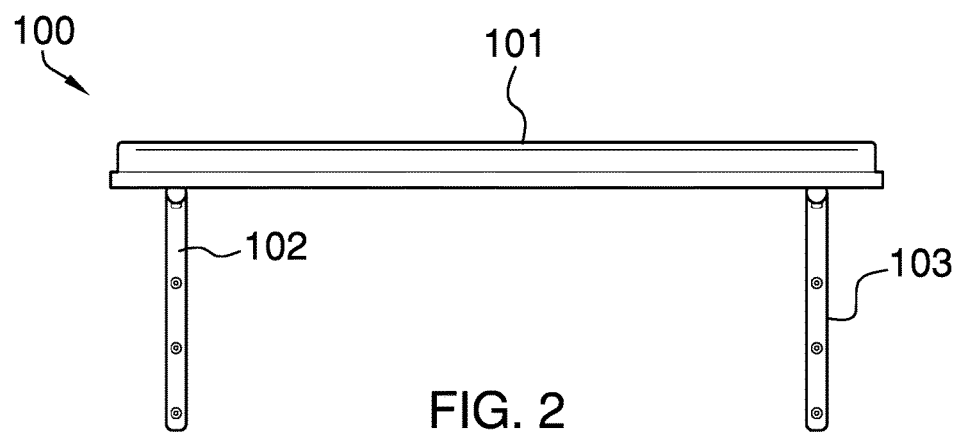
FIG. 2 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The golf cart canopy 100 (hereinafter invention) comprises a canopy 101, a first support 102, and a second support 103. The invention 100 is adapted for use with a golf cart 151. The invention 100 is a non-fixed canopy 101 that provides weather protection for passengers or items that are stored in the rear section 152 of the golf cart 151. The invention 100 retracts onto the golf cart roof 153 when weather protection is not desired. The first support 102 and the second support 103 are mounted to the golf cart 151. The canopy 101 is on the first support 102 and the second support 103.

The canopy 101 structure of the invention 100 acts as a weather block that protects the rear section 152 of the golf cart 151. The canopy 101 comprises a barrier 111 and a carriage 112. The barrier 111 is a structure that provides the actual weather protection. The barrier 111 is formed in the shape of a rectangular plate or a hollow rounded rectangular block. The barrier 111 is further defined with a first surface 115 and a second surface 116. The carriage 112 is the structure that is used to retract and deploy the barrier 111. The carriage 112 is mounted on the first surface 115. The carriage 112 comprises a plurality of wheels 113. Each of the plurality of wheels 113 are mounted on the barrier 111 such that the each of the plurality of wheels 113 will fit into either a first box track 124 or a second box track 134. The plurality of wheels 113 comprises a minimum of four wheels referred to as a first wheel 117, a second wheel 118, a third wheel 119 and a fourth wheel 120. The first box track 124 and the second box track 134 are discussed elsewhere in this disclosure. Methods to mount wheels of rectangular structures are well known and documented in the art.

In the first potential embodiment of the disclosure, each of the plurality of wheels 113 is a readily and commercially available high rebound wheel for inline skates with the associated bearings.

The first support 102 comprises a first strut 121 and a first set of mounting hardware 122. The first strut 121 comprises a first curved brace 123 and a first box track 124. As shown most clearly in FIGS. 1 and 3, the first curved brace 123 is a readily and commercially available perforated square metal tube. The first curved brace 123 is formed such that a first arm 141 of the first curved brace 123 is perpendicular to a second arm 142 of the first curved brace 123. As shown most clearly in FIG. 3, the angle formed by the first arm 141 and the second arm 142 is rounded. As shown most clearly in FIG. 6, a first box track 124 is mounted on the second arm 142 of the first curved brace 123. The first box track 124 is a hollow tubular rectangular structure that is further formed with a first box track aperture 125. The first box track aperture 125 is a groove that is formed in the first box track aperture 125 that is sized to receive any wheel selected from the plurality of wheels 113. The purpose of the first box track 124 and the first box track aperture 125 is to receive a first subset of wheels 126 selected from the plurality of wheels 113 and to guide the selected first subset of wheels 126 while the canopy 101 is being deployed or retracted. The first subset of wheels comprises the first wheel 117 and the second wheel 118. The first support 102 is mounted to the golf cart 151 with the first set of mounting hardware 122. The first set of mounting hardware 122 is readily and commercially available hardware. The first support 102 is mounted on the golf cart 151 such that the canopy 101 will retract onto the golf cart roof 153 while the canopy 101 is not in use and will deploy onto the first support 102 when the canopy 101 is in use.

The second support 103 comprises a second strut 131 and a second set of mounting hardware 132. The second strut 131 comprises a second curved brace 133 and a second box track 134. As shown most clearly in FIGS. 1 and 3, the second curved brace 133 is a readily and commercially available perforated square metal tube. The second curved brace 133 is formed such that a third arm 143 of the second curved brace 133 is perpendicular to a fourth arm 144 of the second curved brace 133.

Figure 3:
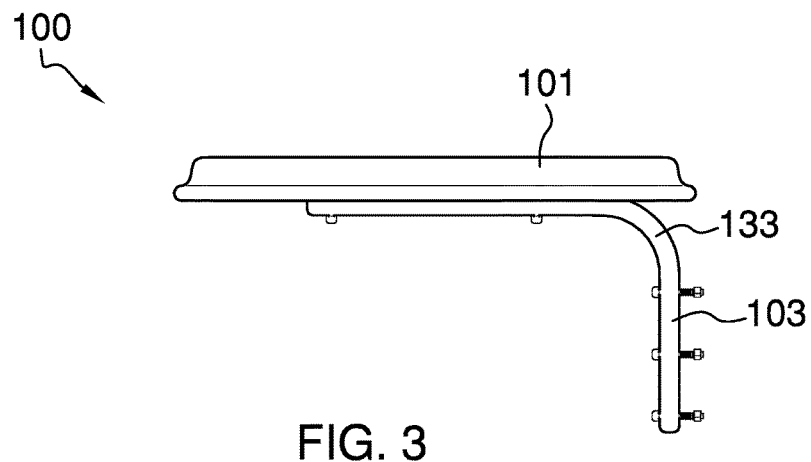
FIG. 3 is a side view of an embodiment of the disclosure.
Figure 4:
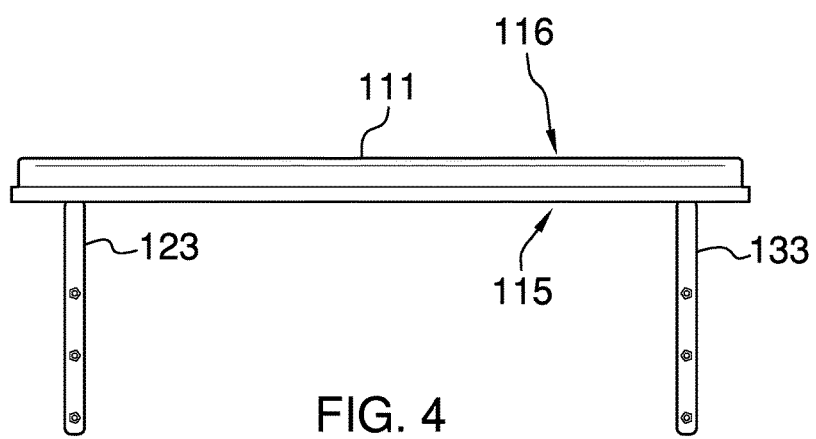
FIG. 4 is a back view of an embodiment of the disclosure.
Figure 5:
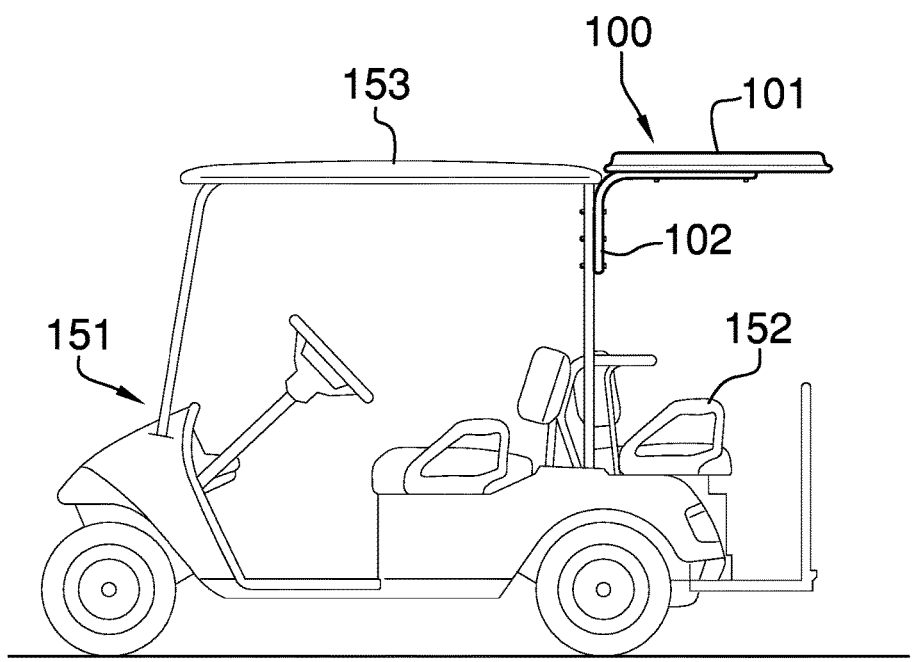
FIG. 5 is an in use view of an embodiment of the disclosure.
Figure 6:
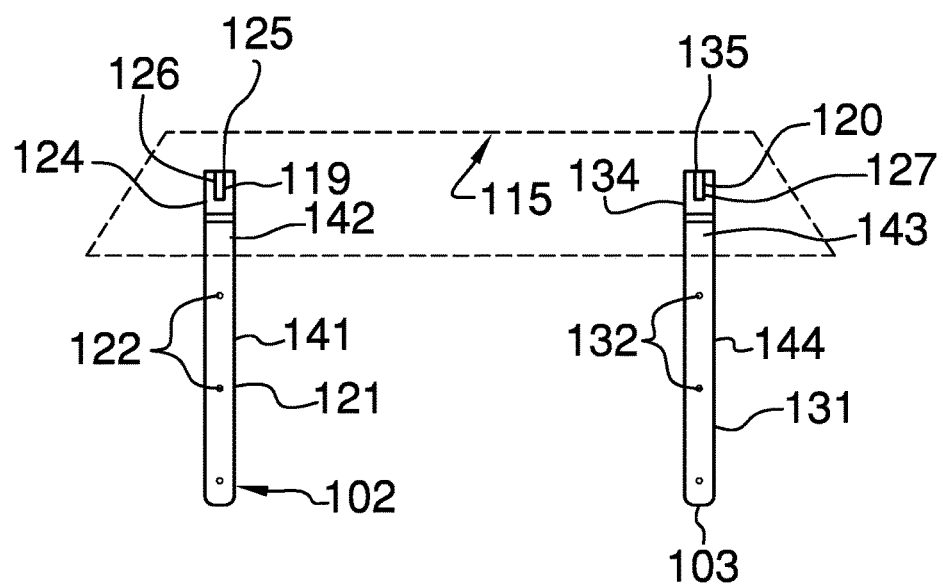
FIG. 6 is a detail view of an embodiment of the disclosure.
Figure 7:
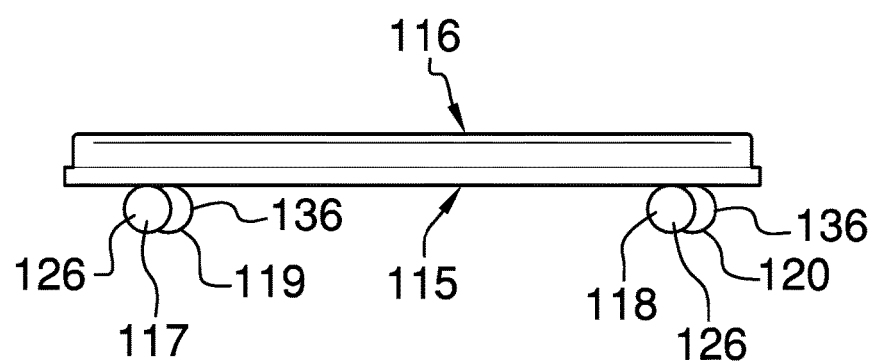
FIG. 7 is a detail view of an embodiment of the disclosure.

As shown most clearly in FIG. 3, the angle formed by the third arm 143 and the fourth arm 144 is rounded. As shown most clearly in FIG. 6, a second box track 134 is mounted on the fourth arm 144 of the second curved brace 133. The second box track 134 is a hollow tubular rectangular structure that is further formed with a second box track aperture 135. The second box track aperture 135 is a groove that is formed in the second box track aperture 135 that is sized to receive any wheel selected from the plurality of wheels 113. The purpose of the second box track 134 and the second box track aperture 135 is to receive a second subset of wheels 136 selected from the plurality of wheels 113 and to guide the selected second subset of wheels 136 while the canopy 101 is being deployed or retracted. The second subset of wheels comprises the third wheel 119 and the fourth wheel 120. The second support 103 is mounted to the golf cart 151 with the second set of mounting hardware 132. The second set of mounting hardware 132 is readily and commercially available hardware. The second support 103 is mounted on the golf cart 151 such that the canopy 101 will retract onto the golf cart roof 153 while the canopy 101 is not in use and will deploy onto the second support 103 when the canopy 101 is in use.

The following definitions were used in this disclosure:

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance.

Rounded Rectangle: A used in this disclosure, a rounded rectangle is a rectangle wherein each corner structure of the rectangle is replaced with a non-perpendicular structure wherein the concave portion of the non-perpendicular structure faces the center of the rounded rectangle.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A roof comprising:
a canopy, a first support, and a second support;
wherein the roof is adapted for use with a golf cart;
wherein the roof is a non-fixed canopy;
wherein the roof is adapted to be mounted over a rear section of the golf cart;
wherein the roof is adapted to retract onto a golf cart roof;
wherein the first support is adapted to attach to the golf cart;
wherein the second support is adapted to attach to the golf cart;
wherein the canopy attaches to the first support and the second support;
wherein the first support comprises a first strut and a first set of mounting hardware;
wherein the second support comprises a second strut and a second set of mounting hardware;
wherein first set of mounting hardware attaches the first support to the golf cart;
wherein second set of mounting hardware attaches the second support to the golf cart;
wherein the first strut comprises a first curved brace and a first box track;
wherein the first box track attaches to the first curved brace;
wherein the second strut comprises a second curved brace and a second box track;
wherein the second box track attaches to the second curved brace;
wherein the first curved brace is formed such that a first arm of the first curved brace is perpendicular to a second arm of the first curved brace;
wherein the second curved brace is formed such that a third arm of the second curved brace is perpendicular to a fourth arm of the second curved brace;
wherein the first box track is a hollow tubular rectangular structure that is further formed with a first box track aperture;
wherein the first box track aperture is a groove;
wherein the second box track is a hollow tubular rectangular structure that is further formed with a second box track aperture;
wherein the second box track aperture is a groove;

wherein the first box track is mounted on the second arm of the first curved brace;
wherein the second box track is mounted on the fourth arm of the second curved brace.

2. The roof according to claim 1
wherein the canopy comprises a barrier and a carriage;
wherein the carriage is attached to the barrier;
wherein the barrier further is further defined with a first surface.

3. The roof according to claim 2
wherein the carriage retracts and deploys the barrier;
wherein the carriage is mounted on the first surface.

4. The roof according to claim 3
wherein the carriage comprises a plurality of wheels;
wherein the plurality of wheels further comprises a first wheel, a second wheel, a third wheel and a fourth wheel.

5. The roof according to claim 4
wherein the first support comprises a first strut and a first set of mounting hardware;
wherein the second support comprises a second strut and a second set of mounting hardware;
wherein first set of mounting hardware attaches the first support to the golf cart;
wherein second set of mounting hardware attaches the second support to the golf cart.

6. The roof according to claim 5
wherein the first strut comprises a first curved brace and a first box track;
wherein the first box track attaches to the first curved brace;
wherein the second strut comprises a second curved brace and a second box track;
wherein the second box track attaches to the second curved brace.

7. The roof according to claim 6
wherein the first curved brace is formed such that a first arm of the first curved brace is perpendicular to a second arm of the first curved brace;
wherein the angle formed by the first arm and the second arm is rounded;
wherein the second curved brace is formed such that a third arm of the second curved brace is perpendicular to a fourth arm of the second curved brace;
wherein the angle formed by the third arm and the fourth arm is rounded.

8. The roof according to claim 7
wherein the first box track is a hollow tubular rectangular structure that is further formed with a first box track aperture;
wherein the first box track aperture is a groove that is formed in the first box track aperture that is sized to receive any wheel selected from the plurality of wheels;
wherein the second box track is a hollow tubular rectangular structure that is further formed with a second box track aperture;
wherein the second box track aperture is a groove that is formed in the second box track aperture that is sized to receive any wheel selected from the plurality of wheels.

9. The roof according to claim 8
wherein the first box track is mounted on the second arm of the first curved brace;
wherein the second box track is mounted on the fourth arm of the second curved brace.

10. The roof according to claim 9
wherein the first box track and the first box track aperture receives a first subset of wheels selected from the plurality of wheels;
wherein the first subset of wheels comprises the first wheel and the second wheel;
wherein the second box track and the second box track aperture receives a second subset of wheels selected from the plurality of wheels;
wherein the second subset of wheels comprises the third wheel and the fourth wheel.

11. The roof according to claim 10
wherein the first box track and the first box track aperture guides the selected first subset of wheels while the canopy is being deployed and retracted;
wherein the second box track and the second box track aperture guides the selected second subset of wheels while the canopy is being deployed and retracted.

12. The roof according to claim 11
wherein the first support is mounted on the golf cart such that the canopy will retract onto the golf cart roof;
wherein the second support is mounted on the golf cart such that the canopy will retract onto the golf cart roof.

13. The roof according to claim 12 wherein each of the plurality of wheels are mounted on the barrier such that the each of the plurality of wheels will fit into a track selected from the group consisting of the first box track or the second box track.

14. The roof according to claim 13 wherein each of the plurality of wheels is a high rebound wheel with the associated bearings.

15. The roof according to claim 14
wherein the first curved brace is a perforated square metal tube;
wherein the second curved brace is a perforated square metal tube.

16. The roof according to claim 1
wherein the canopy comprises a barrier and a carriage;
wherein the carriage is attached to the barrier;
wherein the barrier further is further defined with a first surface;
wherein the carriage retracts and deploys the barrier;
wherein the carriage is mounted on the first surface;
wherein the carriage comprises a plurality of wheels;
wherein the plurality of wheels further comprises a first wheel, a second wheel, a third wheel and a fourth wheel.

17. The roof according to claim 16
wherein the first box track aperture is a groove that is formed in the first box track aperture that is sized to receive any wheel selected from the plurality of wheels;
wherein the second box track aperture is a groove that is formed in the second box track aperture that is sized to receive any wheel selected from the plurality of wheels;
wherein the first box track and the first box track aperture guides the selected first subset of wheels while the canopy is being deployed and retracted;
wherein the second box track and the second box track aperture guides the selected second subset of wheels while the canopy is being deployed and retracted;
wherein the first support is mounted on the golf cart such that the canopy will retract onto the golf cart roof;
wherein the second support is mounted on the golf cart such that the canopy will retract onto the golf cart roof.

18. The roof according to claim 17 wherein each of the plurality of wheels are mounted on the barrier such that the each of the plurality of wheels will fit into a track selected from the group consisting of the first box track or the second box track.

19. The roof according to claim 18
wherein each of the plurality of wheels is a high rebound wheel with the associated bearings;
wherein the first curved brace is a perforated square metal tube;
wherein the second curved brace is perforated square metal tube.

* * * * *